UNITED STATES PATENT OFFICE.

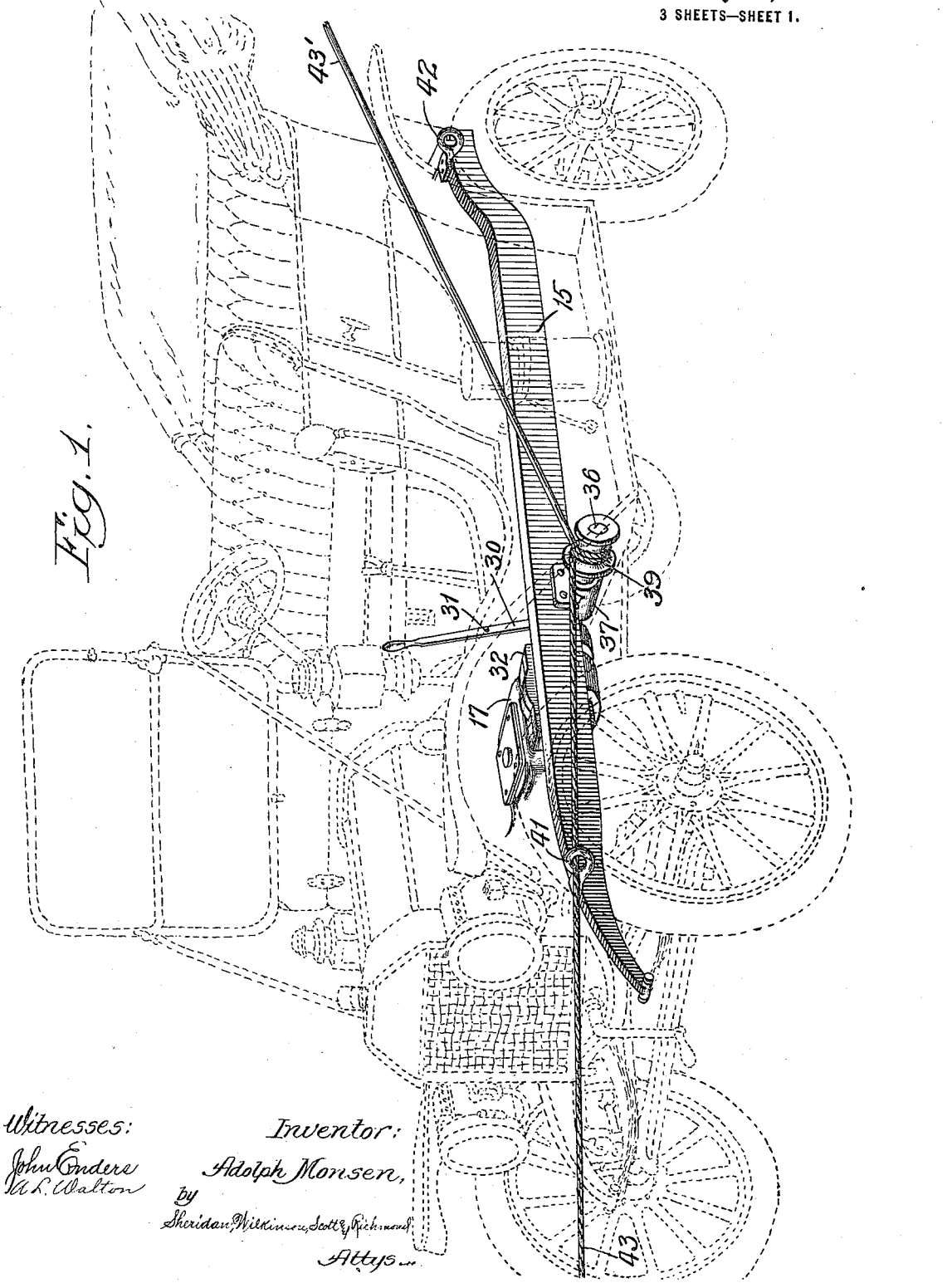

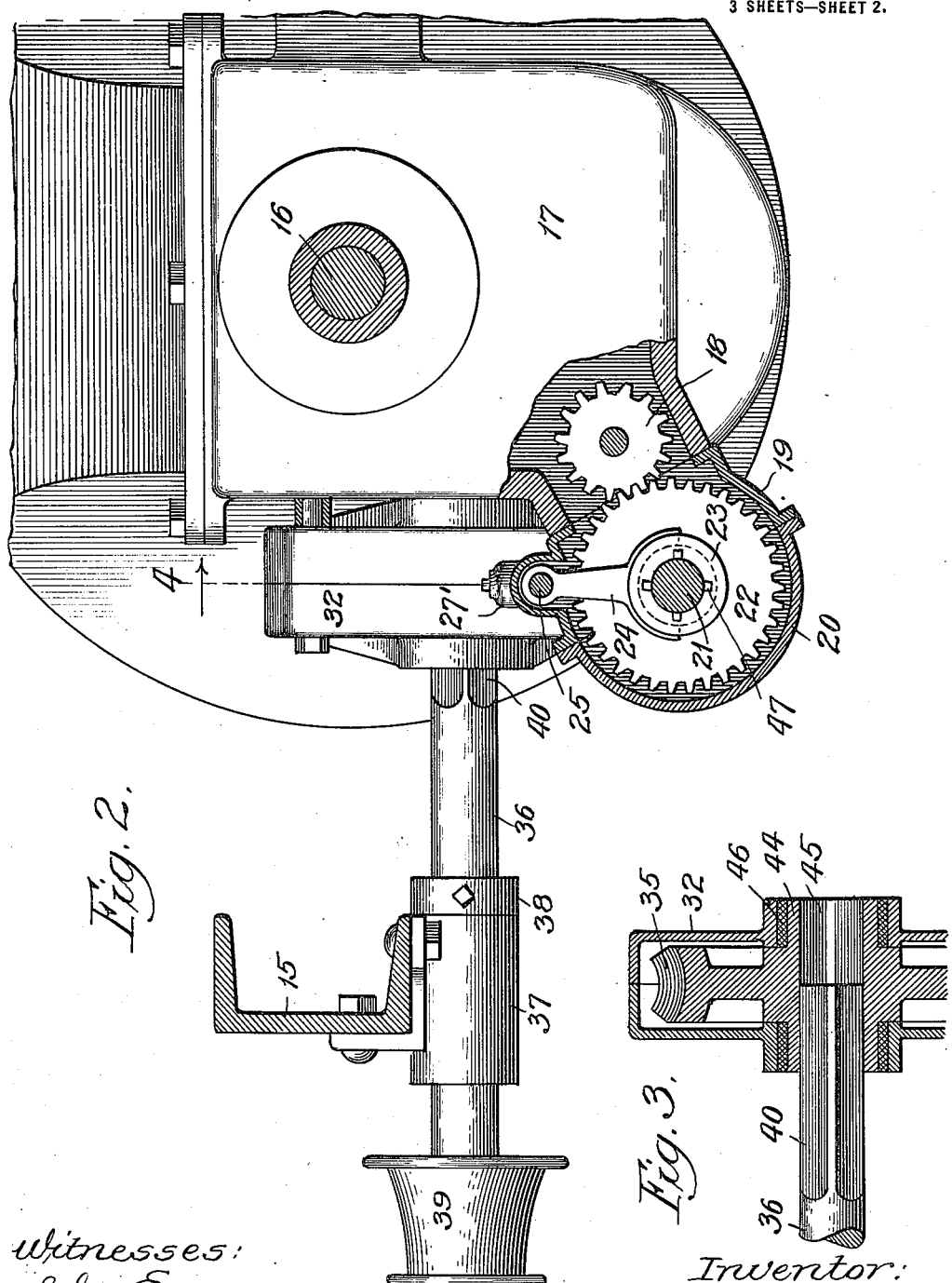

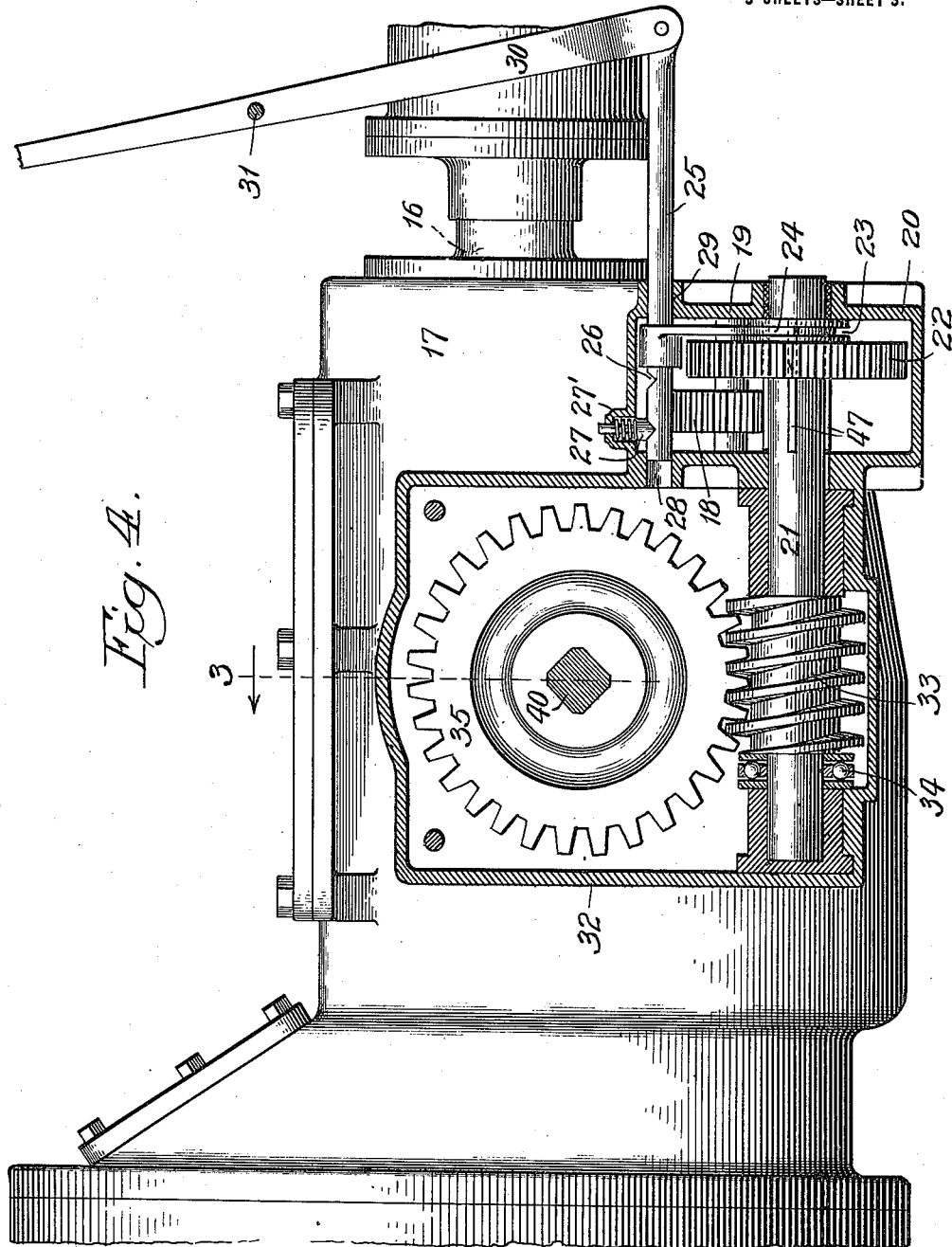

ADOLPH MONSEN, OF CHICAGO, ILLINOIS, ASSIGNOR OF ONE-HALF TO GEORGE C. REW, OF CHICAGO, ILLINOIS.

AUTOMOBILE TRACTION DEVICE.

1,147,035.   Specification of Letters Patent.   Patented July 20, 1915.

Application filed January 2, 1913. Serial No. 739,829.

*To all whom it may concern:*

Be it known that I, ADOLPH MONSEN, a citizen of the United States, residing at Chicago, in the county of Cook and State of Illinois, have invented certain new and useful Improvements in Automobile Traction Devices, of which the following is a specification.

The principal object of my invention is to provide a new and improved device by which an automobile may be pulled out of a bad place in the road by means of its own power.

Another object of my invention is to provide a winding drum on the automobile which may be used in conjunction with a cable to pull the automobile out of a place in which it may have become stuck.

These objects and various others will be made apparent in the following specification and claims, taken with the accompanying drawings, in which, for the purpose of illustration, I have shown one specific embodiment of my invention.

It will be understood that the invention is defined in the appended claims.

Referring to the drawings,—Figure 1 is a perspective view of an automobile showing my improvement applied thereto; Fig. 2 is a transverse vertical section behind the gear casing of the automobile, looking forward; Fig. 3 is a fragmentary detail vertical section taken on the line 3 in Fig. 4, looking in the direction of the arrow; Fig. 4 is a longitudinal vertical section taken on the line 4 in Fig. 2, looking in the direction of the arrow.

As shown in the drawings, the automobile comprises the usual longitudinal side frame member 15 for the chassis, the longitudinal drive shaft 16 and the transmission gear casing 17.

18 is one gear wheel of the transmission system; more particularly, it is a gear wheel which is utilized only when the reverse gears are being operated. Adjacent to the gear wheel 18 is the casing 19, with the removable cap 20, within which is a short longitudinal shaft 21 carrying a gear wheel 22 which engages the shaft 21 by means of a slot and key connection 47. Integral with the wheel 22 is a collar 23 with an annular slot engaged by a fork 24 that depends from the longitudinal sliding shaft 25. This shaft 25 has its bearings at 28 and 29 in the walls of the casing 19. On its upper side it carries two shallow notches 26 adapted to be alternatively engaged by the locking dog 27, which is pressed down by a spring within the housing 27'. The rear end of the rod 25 is pivoted at the lower end to the hand lever 30, which has its fulcrum at 31 just below the floor of the automobile, in front of the driver's seat.

Beside the gear casing 17 is an additional casing 32 which has bearings at its lower end for the shaft 21. This shaft 21 carries a worm 33 and thrust ball bearings 34 are provided as shown in Fig. 4. Within the casing 32, engaged by the worm 33, is the worm wheel 35, which has shoulders 44 rotatably mounted in bushings 46 carried in the walls of the casing 32. At its center the worm wheel 35 has a squared socket 45.

Attached to the under side of the chassis frame member 15 is a journal box 37, within which is mounted the shaft 36 with its squared end 40 fitting in the squared socket 45 of the worm wheel 35. The shaft 36 carries a collar 38 and set screw for the same by which it may be kept in place. At its end the shaft 36 carries a cable-winding drum 39. At the front and rear ends, the chassis frame member 15 carries rings or eyes 41 and 42, through which a cable 43 may be passed. This cable 43 is given one or more turns about the drum 39 and the free end is passed back as designated at 43'.

Normally the gears 22 and 18 are out of mesh, as shown in Fig. 4, so that the automobile operates without operating the drum 39. Also, when the automobile is in ordinary use, the shaft 36 may be removed by loosening the collar 38, and the shaft 36 and drum 39 may be carried within the body of the automobile. When it is desired to use them for the purpose intended, the shaft 36 and drum 39 can be quickly applied as shown in Fig. 2, the squared end 40 of the shaft 36 being thrust into the squared socket 45.

By pulling back on the handle of the lever 30, the rod 25 is shifted forward so as to bring the gears 22 and 18 into mesh. The dog 27 resists this movement, but its resistance may be overcome by sufficient force applied to the lever. The particular transmission of the automobile that actuates the gear 18 should be in operative relation and the clutch of the automobile should be thrown out. Then operating the automobile engine will rotate the drum 39 comparatively slowly, because of the speed reduction between the worm 33 and the worm wheel 35. If the automobile is stuck in the mud and it is desired to pull it forward, one end of the cable 43 may be attached to any convenient object in front, as a tree, then the cable is passed through the ring 41 and wrapped one or more times on the drum 39. While the automobile engine is running, the operator, standing on the ground with the end 43' in his hands, can tighten the cable 43 on the drum 39 so that the drum will engage the cable and wind it thereon. Thus the automobile can be slowly pulled out. If, instead, it is desired to back the automobile out, this can be done by passing the cable through the ring 42 instead of 41.

It will be seen that the stress on the automobile frame, due to the pull on the cable 43, is transmitted directly to the side-bar 15, so that there is no danger of wrenching or destroying any part of the machine.

As already explained, the drum 39 can be quickly removed or replaced. It will be seen that the apparatus is not in the way, and that it is entirely disconnected mechanically from the transmission mechanism when the automobile is in ordinary use.

I claim:

1. In combination with an automobile having transmission gearing and a casing therefor, a worm wheel journaled beside the casing, said worm wheel having a non-circular central hole therethrough, a shaft with a correspondingly shaped end removably engaging said hole, a journal for said shaft on the frame of the automobile, a winding drum on the end of said shaft remote from the worm wheel, a worm engaging said worm wheel, a shaft carrying said worm, a gear wheel mounted on said shaft with a slot and key connection, and means to shift said gear wheel in and out of connection with another gear wheel of said transmission gearing.

2. In combination with an automobile having transmission gearing and a casing therefor, a wheel journaled on the side of the casing, said wheel having a non-circular hole through the center, a journal carried by the automobile frame in alinement with said hole, a shaft in said journal with a non-circular end engaging said hole, a winding drum carried by the projecting end of said shaft, gearing from a gear wheel of the transmission gearing to said first mentioned wheel, and manually operated means to connect and disconnect said gearing.

3. In combination with an automobile comprising transmission gearing and a casing therefor, a winding drum, a shaft carrying said drum, a supplemental gear casing attached to the side of the main gear casing, said shaft projecting into said supplemental gear casing, and gearing in the supplemental casing adapted to transmit rotation from a gear of the main transmission gearing to said shaft.

4. In combination with an automobile, a winding drum, a gear wheel mounted adjacent to the transmission gear casing of the automobile, said gear wheel having a squared socket, a shaft carrying said winding drum and having a squared end to engage said socket, and means to drive said gear wheel from the transmission gearing of the automobile.

5. In combination with an automobile having a gear casing and a longitudinal side frame member, a journal bearing on said member, a supplemental gear casing on the side of the transmission gear casing, a gear wheel within said supplemental gear casing, said gear wheel having a squared socket, a winding drum, a shaft carrying the said winding drum and journaled in said journal bearing, said shaft having a squared end entering the squared socket of the said gear wheel, and mechanism to drive said gear wheel from the transmission gear of the automobile.

In testimony whereof, I have subscribed my name.

ADOLPH MONSEN.

Witnesses:
HENRY A. PARKS,
E. M. ANDERSON.